Oct. 27, 1931.   G. F. YEVSEYEFF   1,829,430
SHOCK ABSORBER FOR VEHICLES
Filed May 17, 1928
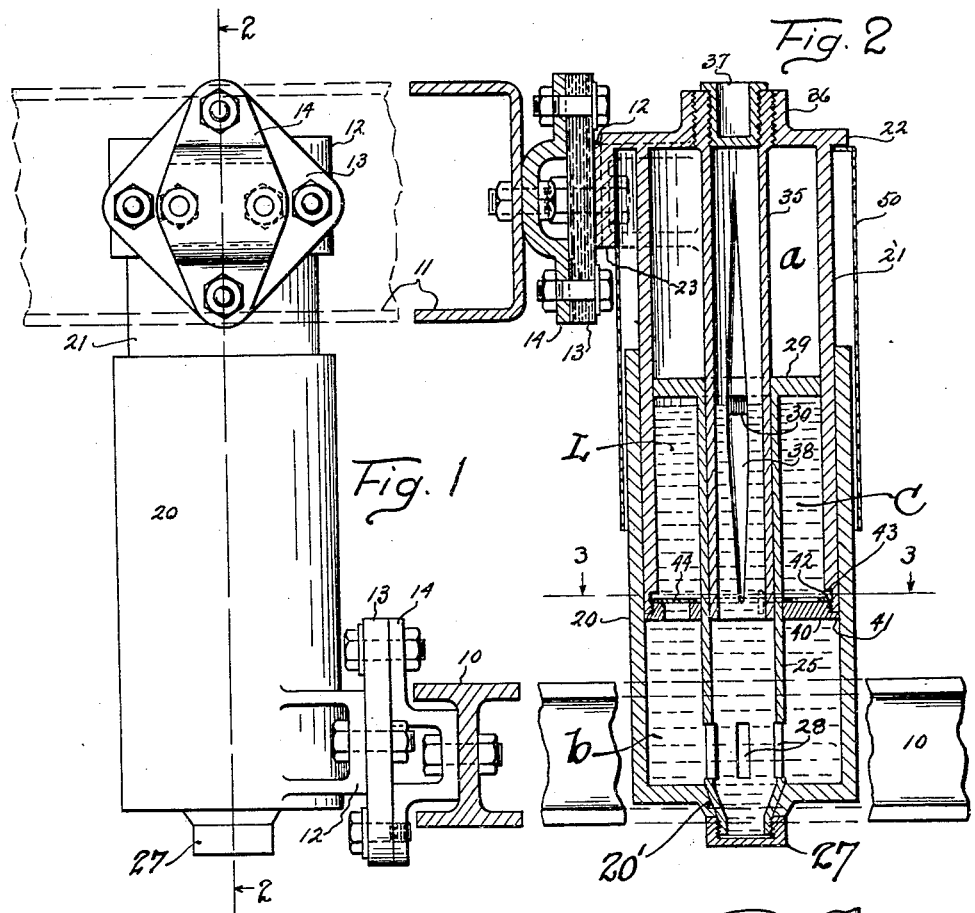
Fig. 1
Fig. 2
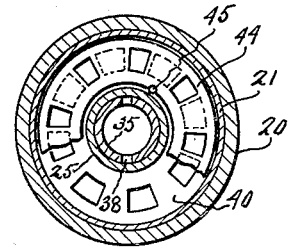
Fig. 3
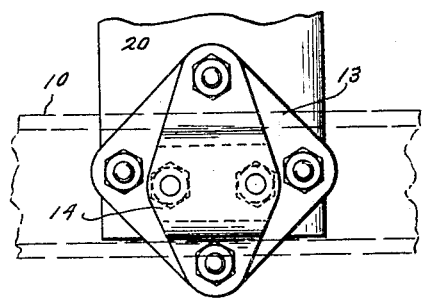
Fig. 4
INVENTOR.
George F. Yevseyeff.
BY Francis D. Hardesty
ATTORNEY.

Patented Oct. 27, 1931

1,829,430

UNITED STATES PATENT OFFICE

GEORGE F. YEVSEYEFF, OF DETROIT, MICHIGAN

SHOCK ABSORBER FOR VEHICLES

Application filed May 17, 1928. Serial No. 278,407.

The present invention relates to shock absorbers for vehicles and particularly to the type in which controlled liquid flow is the movement controlling agent.

Among the objects of the invention is a shock absorber that shall be easily and economically produced and applied and which shall require no adjustment in use.

Another object is a shock absorber that will permit substantially free movement between narrow limits but present increasing resistance to movement beyond such limits.

Further objects will readily occur to those skilled in the art upon reference to the following description and the accompanying drawings.

Fig. 1 is an elevation of the device with the dust shield removed.

Fig. 2 is a section on line 2—2 of Fig. 1.

Fig. 3 is a section on line 3—3 of Fig. 2 with a portion of the valve broken away, and Fig. 4 is an elevation of the mounting means at the lower end.

As indicated in the drawings, the shock absorber comprises a device to be interposed between an axle 10 and a frame member 11 of a vehicle for the purpose of controlling the spring action. The two ends of the device are preferably secured by means of flanged brackets 12, preferably integral with the adjacent parts of the device, bolted to blocks of fabric material 13 which in turn are bolted to brackets 14 secured to the frame member 11 or axle 10. The bolts securing the respective brackets 12 to the fabric blocks 13 will be spaced so as to permit a small amount of universal movement between the device and the vehicle members.

The device proper comprises two telescoping cups 20 and 21 of which the lower one 20, opening upward, is the larger in diameter and is a plain cylindrical cup with the bracket 12 integral therewith and with a passage 20′ through its bottom, which passage will be tapered at its inner end and preferably faced smoothly at its outer end.

The upper and somewhat smaller cup 21 is provided with an exterior flange 22 at its upper end which flange, on one side, is provided with a depending portion 23 forming an integral part of the bracket 12 which is thus spaced from the cylinder wall.

The cup 21 should be small enough to slide within cup 20 but tight enough to prevent escape of liquid.

The cup 20 is provided with an axial tube 25 having a tapered and threaded lower end 26 adapted to fit in the tapered passage 20′ above mentioned and be held tightly therein by a screw cap 27. This tube 25 has near its lower end, one or more openings 28 and at its upper end a wide peripheral flange 29 forming a piston adapted to fit in the upper cup 21, and it is likewise provided with one or more openings 30 under the flange.

The upper cup 21 also has an axial tube 35 which is screwed into a suitable boss 36 in the upper closed end of said cup. The tube 35 is also threaded interiorly for the reception of a plug 37. This tube 35 is of a suitable size to slide within the tube 25 and is provided with one or more longitudinal openings 38 which at about mid-length are of substantial width and with parallel sides but which taper toward both ends, as shown in Fig. 2.

Further, the lower end of cup 21 is provided with a perforated and flanged closure plate 40, annular in form and adapted to slide on the outside of tube 25.

This closure plate 40 is threaded into the lower end of the cup 21 and its movement into place limited by its flange 41 so as to leave an annular recess 42 between said plate and a suitable shoulder 43 for the reception of a suitable valve plate or disk 44 also annular and perforated. The latter disk 44, however, is arranged so that its perforations do not register with the perforations in plate 40 and this arrangement is maintained by means of a pin 45 fixed in plate 40 but loose in valve 44.

It is preferred to secure to the flange 22 on the upper cup 21 a third cup 50 which slides over cup 20 and prevents deposit of dust and dirt on the outside of cup 21.

In operation, the device will be filled with a suitable liquid L up to just below the piston or flange 29. When, through spring action, the frame 11 approaches the axle 10 the two cups 20, 21 will be telescoped. When this happens, the bottom and top chambers *a*, *b* become smaller and the intermediate chamber *c* larger. The liquid L must therefore flow into the intermediate chamber *c*, which it readily does through valve 44 and to some extent through openings 28, tube 25 and openings 30 and 38.

Upon the return spring action and the extension of the device, the intermediate chamber *c* becomes smaller and the end chambers *a*, *b* larger and therefore the liquid L must flow from the intermediate chamber *c* to the end chambers *a*, *b*. In such a case, the valve 44 closes and the liquid L is forced to pass through opening 30 which is in effect varied in size by the position of opening 38, the telescoped condition placing the opening 30 opposite the upper narrow end of opening 38.

Resistance to flow of the liquid L out of the intermediate chamber *c* will therefore be great at the beginning of such extension and lessen as the cups 20, 21 approach their intermediate or rest position which is about that shown in the drawings.

The action in the opposite directions will cause a reverse flow controlled as indicated.

Now having described the invention and the preferred form of embodiment thereof it is to be understood that said invention is to be limited not to the specific details herein set forth and illustrated, but only by the scope of the claims which follow.

I claim:—

1. A shock absorber comprising telescoping cups adapted to be secured respectively to two relatively movable members, an axially located tube in each cup also adapted to telescope, the outer tube carrying a piston slidable in the inner of said cups and dividing the space in the cups, said tubes being provided with registering openings, the opening in said inner tube extending for a considerable portion of the length thereof and decreasing in width toward its ends, a body of liquid in said cups, and means actuated by relative movement of said cups, to cause flow of liquid from one side of said piston to the other through said openings in said tubes.

2. A shock absorber comprising a cup member having a valved annular plate secured over its open end with an axial tube secured to the other end and extending through said plate but spaced therefrom, a second cup adapted to telescope over said first cup, an axial tube fixed in the bottom of said second cup and adapted to telescope over said first tube and fit slidably in the space between said first tube and plate, a piston carried by said second tube and fitting in said first cup, and there being registering openings in said tubes below said piston, the opening in said first tube extending above and below said piston and decreasing in width toward its ends, and there also being openings near the bottom of the second tube.

3. A shock absorber including telescoping sections, a piston carried by each section and operating in the adjacent section, each section embodying an outer chamber and an inner chamber, said chambers being in communication with each other and said pistons adapted to force liquid from the inner chamber to the outer chamber to retard movement of the sections with respect to each other.

4. In a shock absorber for vehicles, an upper section and a lower section telescopically arranged, each section having an inner liquid chamber and an outer liquid chamber, said chambers being in communication, means in the sections for forcing the liquid from the inner chambers to the outer chambers when the sections are moved towards each other, and means for securing the shock absorber between the chassis and axle of a motor vehicle.

5. A shock absorber for vehicles including telescoping tubular sections, each of said sections carrying a piston, each of said sections having an inner chamber and an outer chamber, means for establishing communication between the chambers, and a valve on one piston for controlling the passage of liquid past the piston having the valve to restrict movement of the cylinders with respect to each other.

GEORGE F. YEVSEYEFF.